United States Patent [19]

Nakamura

[11] 3,964,917

[45] June 22, 1976

[54] OBJECTS OF MARBLE-LIKE GLASS CERAMIC

[75] Inventor: Shigeji Nakamura, Otsu, Japan

[73] Assignee: Nippon Electric Glass Company, Limited, Tokyo, Japan

[22] Filed: Jan. 2, 1975

[21] Appl. No.: 539,160

Related U.S. Application Data

[63] Continuation-in-part of Ser. No. 312,631, Dec. 6, 1972, abandoned.

[30] Foreign Application Priority Data

Dec. 10, 1971 Japan.............................. 46-99500

[52] U.S. Cl.................................... 106/39.6; 65/33
[51] Int. Cl.² .......................................... C03C 3/22
[58] Field of Search....................... 106/39.6; 65/33

[56] References Cited

UNITED STATES PATENTS

| 3,673,049 | 6/1972 | Giffen et al. | 106/39.6 |
| 3,761,235 | 9/1973 | Muanaka et al. | 65/33 |

*Primary Examiner*—Helen M. McCarthy
*Attorney, Agent, or Firm*—Kurt Kelman

[57] ABSTRACT

Objects of marble-like glass ceramic are readily obtained from a thermally crystallizable composition consisting essentially of 50% – 65% $SiO_2$, 3% – 13% $Al_2O_3$, 15% – 25% CaO, and 2% – 10% ZnO when heat treated to convert at least a portion of the surface layer to crystals of $\beta$-wollastonite.

17 Claims, No Drawings

OBJECTS OF MARBLE-LIKE GLASS CERAMIC

This application is a continuation-in-part of our copending application Ser. No. 312,631, filed Dec. 6, 1972 now abandoned.

This invention relates to a material combining the appearance of natural marble with the chemical resistance and other desirable properties of glass, and particularly to a composition of matter and to shaped, marble-like objects made from the composition.

It is known from U.S. Pat. No. 3,761,235, that certain glass compositions may be converted partly to $\beta$-wollastonite by heat treatment, and that the heat treated compositions have the appearance of natural marble while retaining the desirable properties of glass. However, the known glass compositions have relatively high fusing temperatures, and the minimum temperature required for plastic working or molding, that is the temperature at which the glass has a viscosity of about 102.5 poises, is relatively close to the liquidus temperature, making it difficult to avoid devitrification during continuous molding, and retarding recrystallization during heat treatment.

It has now been found that the shortcomings of these known glass compositions can be overcome by including ZnO among the essential constituents, the others being $SiO_2$, $Al_2O_3$ and CaO. The fusion temperature of glasses of the invention is below about 1500°C, and the temperature difference between the liquidus temperature and the molding temperature is at least 40°C.

More specifically, the thermally crystallizable glass composition of the invention contains, as essential ingredients, 50% – 65% $SiO_2$, 3% – 13% $Al_2O_3$, 15% – 25% CaO, and 2% – 10% ZnO. It may contain also up to 13% $Na_2O$ + $K_2O$, up to 3% $B_2O_3$ and up to 10% BaO. All percentages are by weight.

Objects of the marble-like material may be prepared by heating a batch of raw material having the required overall composition to a temperature between 1400°C and 1500°C until fused, shaping the melt into a desired configuration, and permitting the shaped mass to cool. It assumes the marble-like appearance when reheated to a temperature between 1000° and 1200°C, and held at that temperature for about two to three hours.

The following example further illustrates the invention, All parts and percentage values are by weight unless stated otherwise:

Fourteen batches of glass compositions were prepared to the formulations shown in the Table. In preparing batch No. 1, powdered silica, aluminum hydroxide, calcium carbonate, potassium nitrate, sodium nitrate, boric acid, zinc white, and barium carbonate were mixed intimately in amounts to satisfy the formulation. The mixed materials were fused at 1440°C in an electric furnace for five hours in a platinum crucible. The fused glass was poured into a die, pressed into the shape of a plate, and then slowly cooled to ambient temperature. The plate was then heated in a furnace to 1150°C at a rate of 120°C per hour and held at that temperature for two hours.

At about 1000°C, the formation of needle-like crystals started from the surface of the plate, and the crystals grew inward from the surface until the plate, upon completion of the heat treatment, appeared to consist of an aggregate of needle-like crystals similar in appearance and texture to natural marble, but actually embedded in an amorphous matrix. The crystalline phase was identified as $\beta$-wollastonite by X-ray diffraction.

Batches Nos. 2 to 14 were prepared in an analogous manner, the relevant data being listed in the Table. The reheating temperature was 1150°C in all instances, the time at reheating temperature was two hours for Batches 1 to 12, and three hours for batches 13 and 14. The reheated plates resembled white marble, with the exception of Batch No. 10 which was light brown, Batches Nos. 9 and 12 which were green, Batch No. 11 which was blue, and Batch No. 14 which was black.

As is evident from the Table, the compositions of this invention have fusion temperatures about 60°C lower than those of the aforementioned patent, the differences between the molding temperature and the liquidus temperature is at least 40°C, and the crystal growth during reheating is significantly faster than in the known composition.

The composition of Batch No. 1, which is typical of this invention, has a bending strength of 500 kg/cm² as compared to a value of 100 to 250 kg/cm² for natural marble when the test is performed on rods 10 mm × 15 mm × 100 mm by means of a three-point load tester. The hardness of the glass composition is 6.5 on the Mohs scale as compared to 3.5 for marble. The coefficient of thermal expansion is $57 \times 10^{-7}$ per °C at 30° – 380°C while the corresponding value for marble is between 80 and $250 \times 10^{-7}$ per °C. Neither marble nor the glass of Batch No. 1 cracks when specimens 50 mm square and 10 mm thick are heated to 400°C and then immersed in cold water. The glass composition, of course, is not affected by immersion in an aqueous acid which completely dissolves the marble.

The amounts of essential glass former and other ingredients in the compositions of the invention are chosen according to the following considerations:

It is difficult to cause crystallization of $\beta$-wollastonite if CaO is present in the composition in amounts smaller than 15%. More than 25% CaO unduly raises the liquidus temperature and causes difficulties in molding. At least 3% $Al_2O_3$ is required to prevent phase separation and to produce a homogeneous glass. When $Al_2O_3$ amounts to more than 13%, the growth rate of the $\beta$-wollastonite crystals is significantly reduced, and uniform crystallization is difficult to attain. At least 50% $SiO_2$ is needed to maintain a spread between the liquidus temperature and the molding temperature which permits rapid molding. When $SiO_2$ exceeds 65%, the fusion temperature is raised above 1500°C and the growth rate of the $\beta$-wollastonite crystals is low. No less than 2% ZnO is needed for the desired difference between the liquidus temperature and the molding temperature. More than 10% ZnO reduces the rate of crystal growth.

$Na_2O$ and/or $K_2O$ in joint amounts not exceeding 13% hasten crystallization of $\beta$-wollastonite and are, therefore, desirable optional ingredients. When present in larger amounts, they promote the formation of crystals other than $\beta$-wollastonite and also reduce the difference between the liquidus temperature and the working temperature.

An optional small amount of $B_2O_3$, not more than 3% facilitates fusion of the initial batch but larger amounts of $B_2O_3$ retard crystallization of the $\beta$-wollastonite and are to be avoided for economical reheating furnace operation.

Another optional ingredient is BaO which has no detrimental effect in amounts not exceeding 10% but reduces the difference between the molding temperature and the liquidus temperature if in excess of 10%.

Small amounts of heavy metal oxides, not exceeding 5%, may be used to produce the desired coloring effects evident from Table 1, without impairing desirable properties.

Because of their relatively low fusion temperatures, greater differences between liquidus and molding temperatures and rapid crystal growth during reheating, shaped, marble-like bodies according to this invention are less costly than otherwise comparable products of the known composition.

$Al_2O_3$, 20.0% CaO, 3.5% $K_2O + Na_2O$, 0.6% $B_2O_3$, and 7.1% ZnO.

8. The pseudo-marble body as claimed in claim 1, wherein said composition consists of 59.7% $SiO_2$, 6.9% $Al_2O_3$, 19.3% CaO, 3.3% $K_2O + Na_2O$, 0.9% $B_2O_3$ and 9.9% ZnO.

9. The pseudo-marble body as claimed in claim 1, wherein said composition consists of 63.9% $SiO_2$, 5.3% $Al_2O_3$, 19.5% CaO, 3.6% $K_2O + Na_2O$, 0.6% $B_2O_3$ and 7.1% ZnO.

10. The pseudo-marble body as claimed in claim 1, wherein said composition consists of 60.6% $SiO_2$, 7.0%

TABLE

| Batch No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $SiO_2$ | 59.1 | 58.4 | 61.6 | 61.7 | 59.7 | 63.9 | 60.6 | 56.6 | 59.0 | 59.0 | 59.0 | 59.0 | 60.7 | 59.0 |
| $Al_2O_3$ | 6.8 | 8.9 | 7.1 | 7.1 | 6.9 | 5.3 | 7.0 | 6.5 | 6.8 | 6.8 | 6.8 | 6.8 | 6.8 | 6.8 |
| CaO | 19.1 | 21.8 | 20.0 | 20.0 | 19.3 | 19.5 | 19.6 | 18.3 | 19.1 | 19.1 | 19.1 | 19.1 | 20.8 | 19.1 |
| $K_2O$ | 1.6 | 1.8 | 1.7 | 1.7 | 1.6 | 1.8 | 1.7 | 1.6 | 1.6 | 1.6 | 1.6 | 1.6 | | |
| $Na_2O$ | 1.7 | 1.8 | 1.8 | 1.8 | 1.7 | 1.8 | 3.5 | 1.7 | 1.7 | 1.7 | 1.7 | 1.7 | | |
| $B_2O_3$ | 0.6 | 2.2 | | 0.6 | 0.9 | 0.6 | 0.6 | 0.6 | 0.6 | 0.6 | 0.6 | 0.6 | 0.6 | 0.6 |
| ZnO | 6.8 | 5.1 | 7.8 | 7.1 | 9.9 | 7.1 | 7.0 | 6.5 | 6.8 | 6.8 | 6.8 | 6.8 | 6.8 | 6.8 |
| BaO | 4.3 | | | | | | | 8.2 | 4.2 | 4.3 | 4.3 | 4.2 | 4.3 | 4.2 |
| Other | | | | | | | | | 0.2 | 0.1 | 0.1 | 0.2 | | 3.5 |
| | | | | | | | | | CuO | NiO | CoO | $Fe_2O_3$ | | $Fe_2O_3$ |
| Fusion temp. °C | 1440 | 1395 | 1430 | 1435 | 1440 | 1495 | 1425 | 1425 | 1440 | 1440 | 1440 | 1440 | 1450 | 1430 |
| Molding temp. °C | 1290 | 1270 | 1290 | 1295 | 1275 | 1330 | 1270 | 1265 | 1290 | 1290 | 1290 | 1290 | 1295 | 1270 |
| Liquidus temp. °C | 1230 | 1225 | 1240 | 1220 | 1195 | 1245 | 1230 | 1220 | 1230 | 1230 | 1230 | 1230 | 1190 | 1185 |

1. A pseudo-marble body essentially consisting of a composition consisting essentially of 56.6% to 63.9% $SiO_2$, 5.3% to 8.9% $Al_2O_3$, 18.3% to 21.8% CaO, 5.1% to 9.9% ZnO, 0% to 8.2% BaO, 0% to 2.2% $B_2O_3$, and 0% to 5.2% $Na_2 + K_2O$, the total amount of $SiO_2$, $Al_2O_3$ and CaO being within the range of 81.4% and 89.1%, all percentages being by weight, the composition constituting elongated crystals of $\beta$-wollastonite and a matrix, and the crystals being embedded in the matrix.

2. A body as set forth in claim 1, wherein said composition further comprises a coloring agent selected from the group consisting of $Fe_2O_3$, CoO, NiO, and CuO, the amount of said coloring agent being sufficient to impart a color other than white to said composition and being no greater than 5% by weight.

3. A body as set forth in claim 1, wherein said crystals extend longitudinally from the surface of said body inward of said body.

4. The pseudo-marble body as claimed in claim 1, wherein said composition consists of 59.1% $SiO_2$, 6.8% $Al_2O_3$, 19.1% CaO, 3.3% $K_2O + Na_2O$, 0.6% $B_2O_3$, 6.8% ZnO, and 4.3% BaO.

5. The pseudo-marble body as claimed in claim 1, wherein said composition consists of 58.4% $SiO_2$, 8.9% $Al_2O_3$, 21.8% CaO, 3.6% $K_2O + Na_2O$, 2.2% $B_2O_3$, and 5.1% ZnO.

6. The pseudo-marble body as claime in claim 1, wherein said composition consists of 61.6% $SiO_2$, 7.1% $Al_2O_3$, 20.0% CaO, 3.5% $K_2O + Na_2O$, and 7.8% ZnO.

7. The pseudo-marble body as claimed in claim 1, wherein said composition consists of 61.7% $SiO_2$, 7.1%

$Al_2O_3$, 19.6% CaO, 5.2% $K_2O + Na_2O$, 0.6% $B_2O_3$ and 7.0% ZnO.

11. The pseudo-marble body as claimed in claim 1, wherein said composition consists of 56.6% $SiO_2$, 6.5% $Al_2O_3$, 18.3% CaO, 3.3% $K_2O + Na_2O$, 0.6% $B_2O_3$, 6.5% ZnO and 8.2% BaO.

12. The pseudo-marble body as claimed in claim 1, wherein said composition consists of 60.7% $SiO_2$, 6.8% $Al_2O_3$, 20.8% CaO, 0.6% $B_2O_3$, 6.8% ZnO and 4.3% BaO.

13. The pseudo-marble body as claimed in claim 1, wherein said composition consists of 59.0% $SiO_2$, 6.8% $Al_2O_3$, 19.1% CaO, 3.3% $K_2O + Na_2O$, 0.6% $B_2O_3$, 6.8% ZnO, 4.2% BaO, and 0.2% CuO.

14. The pseudo-marble body as claimed in claim 1, wherein said composition consists of 59.0% $SiO_2$, 6.8% $Al_2O_3$, 19.1% CaO, 3.3% $K_2O + Na_2O$, 0.6% $B_2O_3$, 6.8% ZnO, 4.3% BaO and 0.1% NiO.

15. The pseudo-marble body as claimed in claim 1, wherein said composition consists of 59.0% $SiO_2$, 6.8% $Al_2O_3$, 19.1% CaO, 3.3% $K_2O + Na_2O$, 0.6% $B_2O_3$, 6.8% ZnO, 4.3% BaO and 0.1% CoO.

16. The pseudo-marble body as claimed in claim 1, wherein said composition consists of 59.0% $SiO_2$, 6.8% $Al_2O_3$, 19.1% CaO, 3.3% $K_2O + Na_2O$, 0.6% $B_2O_3$, 6.8% ZnO, 4.2% BaO and 0.2% $Fe_2O_3$.

17. The pseudo-marble body as claimed in claim 1, wherein said composition consists of 59.0% $SiO_2$, 6.8% $Al_2O_3$, 19.1% CaO, 0.6% $B_2O_3$, 6.8% ZnO, 4.2% BaO and 3.5% $Fe_2O_3$.

* * * * *